(12) United States Patent
Koepp et al.

(10) Patent No.: US 7,403,122 B1
(45) Date of Patent: Jul. 22, 2008

(54) RFID TAG CIRCUITS OPERABLE AT DIFFERENT SPEEDS

(75) Inventors: Ronald Lee Koepp, Seattle, WA (US); Alberto Pesavento, Seattle, WA (US); William T. Colleran, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 44 days.

(21) Appl. No.: 11/707,509

(22) Filed: Feb. 15, 2007

Related U.S. Application Data

(60) Provisional application No. 60/773,723, filed on Feb. 15, 2006.

(51) Int. Cl.
*G08B 13/14* (2006.01)

(52) U.S. Cl. .............. 340/572.5; 340/572.1; 340/572.4; 340/572.7; 340/10.1; 340/10.2; 455/73; 455/75; 455/77; 713/300; 713/320; 713/322; 713/501; 713/601

(58) Field of Classification Search .............. 340/572.5, 340/572.1, 572.4, 572.7, 10.1, 10.2; 713/501, 713/601, 300, 320, 322; 455/73, 75, 77
See application file for complete search history.

(56) References Cited

U.S. PATENT DOCUMENTS

| | | | |
|---|---|---|---|
| 6,606,713 B1 * | 8/2003 | Kubo | 713/501 |
| 2005/0210302 A1 * | 9/2005 | Kato et al. | 713/320 |
| 2007/0100921 A1 * | 5/2007 | Barnett et al. | 708/250 |

* cited by examiner

*Primary Examiner*—Tai T Nguyen
(74) *Attorney, Agent, or Firm*—Dorsey & Whitney LLP

(57) ABSTRACT

Embodiments of RFID tag circuits and methods are described, which include a chip having a clock circuit operable to generate a clock signal having different frequencies, and one or more components operable to work at the different frequencies. In addition to a regular frequency, at least one higher frequency is possible, which is enabled in situations where a reader is known to be close to the chip. The proximity ensures that the chip generates reliably more power, which enables its operation at the higher speed.

45 Claims, 9 Drawing Sheets

RFID SYSTEM

*RFID SYSTEM*

*RFID TAG*

*RFID TAG CIRCUIT*

*RFID TAG CIRCUIT RECEIVING
THE CONTROL COMMAND WIRELESSLY*

*MAIN CLOCK CIRCUIT*

*MAIN CLOCK CIRCUIT*

*ADJUSTABLE CLOCK GENERATOR WITH FEEDBACK*

*ADJUSTABLE CLOCK GENERATOR USING A DIVIDER*

FUNCTIONAL BLOCK DIAGRAM
OF TAG CIRCUIT COMPONENTS

RFID TAG CIRCUITS OPERABLE AT DIFFERENT SPEEDS

CROSS REFERENCE TO RELATED PATENT APPLICATIONS

This patent application claims priority from U.S.A. Provisional Patent Application No. 60/773,723, filed on 2006 Feb. 15, the disclosure of which is hereby incorporated by reference for all purposes.

BACKGROUND

1. Field of the Invention

The present description is related to the field of Radio Frequency Identification (RFID) systems, and more specifically to RFID tag circuits that are operable at different speeds, and related methods.

2. Description of the Related Art

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

In a number of situations, a large number of RFID tag chips must be read and processed. These include field situations, but also testing chips as they are produced, to ensure their integrity. Such reading takes place wirelessly, and is inherently limited by the speed of operation of each chip. This limits, for example, the speed of field reading situations, and also testing, which ultimately affects production throughput.

BRIEF SUMMARY

The present description gives instances of RFID tag circuits and methods, the use of which may help overcome problems and limitations of the prior art.

In some embodiments, an RFID tag circuit can operate at the different frequencies. While in the field, it can operate at a regular speed, under specified field reading conditions. These conditions include potentially a large reading distance from the reader, with correspondingly low power to the circuit.

In addition, the circuit is amenable to operating at a different, substantially higher speed. This is done for certain reading conditions where it is known that the reader will be close to the circuit. The proximity ensures that the chip generates reliably more power, which enables its operation at the higher speed.

An advantage over the prior art is that the RFID tag chip can be read and/or written to faster. This helps in a number of field reading situations, and in production throughput.

These and other features and advantages of this description will become more readily apparent from the following Detailed Description, which proceeds with reference to the drawings, in which:

DETAILED DESCRIPTION

As has been mentioned, the present description is about RFID tag circuits that are operable at different speeds, and related methods. Certain details are set forth below to provide a sufficient understanding of the invention. However, it will be clear to one skilled in the art that the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
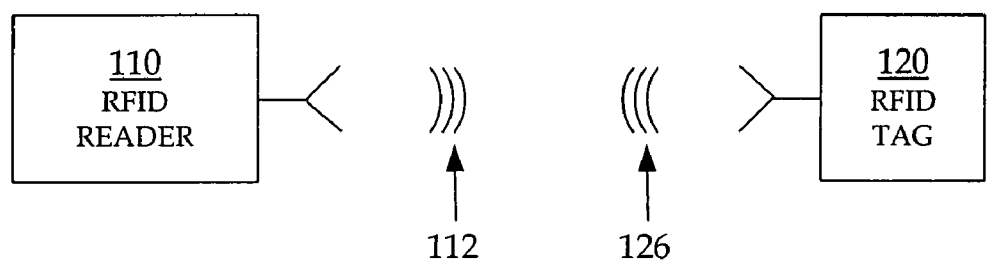
FIG. 1 is a block diagram of an RFID system.

The subject is now described in more detail. FIG. 1 is a diagram of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired.

Tag 120 can be a passive tag or an active tag, i.e. having its own power source. Where tag 120 is a passive tag, it is powered from wave 112.

Figure 2:
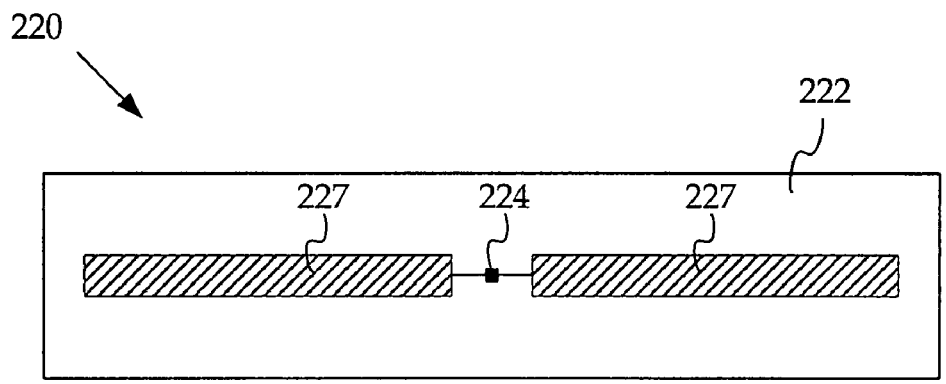
FIG. 2 is a diagram showing components of a passive RFID tag, such as the one shown in FIG. 1.

FIG. 2 is a diagram of an RFID tag 220. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and responds if appropriate, based on the incoming signal and its internal state. In order to respond by replying, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

Figure 3:
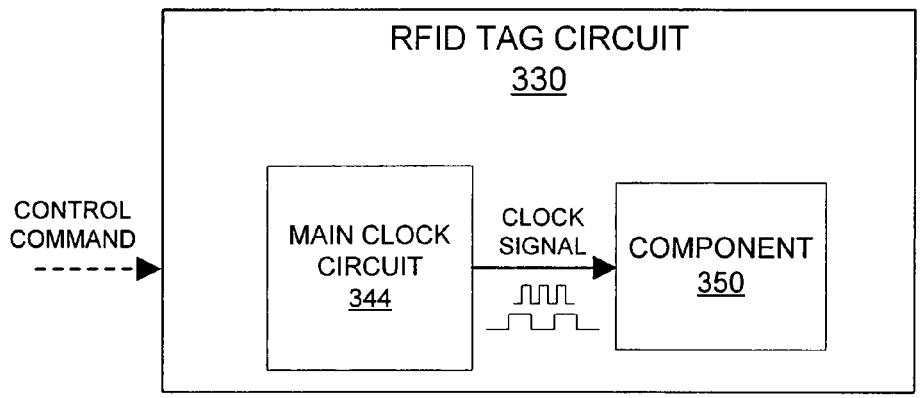
FIG. 3 is a block diagram of an RFID tag circuit according to embodiments.

FIG. 3 is a block diagram of an RFID tag circuit 330 operable at different frequencies according to embodiments. Circuit 330 includes a main clock circuit 344 and a component 350.

Main clock circuit 344 is operable to generate a clock signal, which has a regular frequency for regular operation of component 350, and at least one more frequency. The additional frequency can be a fast frequency that is at least 50% faster than the regular frequency, or even 75% faster. Main clock circuit 344 may be implemented in any number of ways, as will be apparent to a person skilled in the art. Some such ways are described later in this document.

Component 350 is coupled to receive the clock signal from main clock circuit 344. Component 350 is operable either at the regular frequency, or at the fast frequency, or at any frequency of the clock signal, responsive to receiving it. This is now described in more detail.

Figure 4:
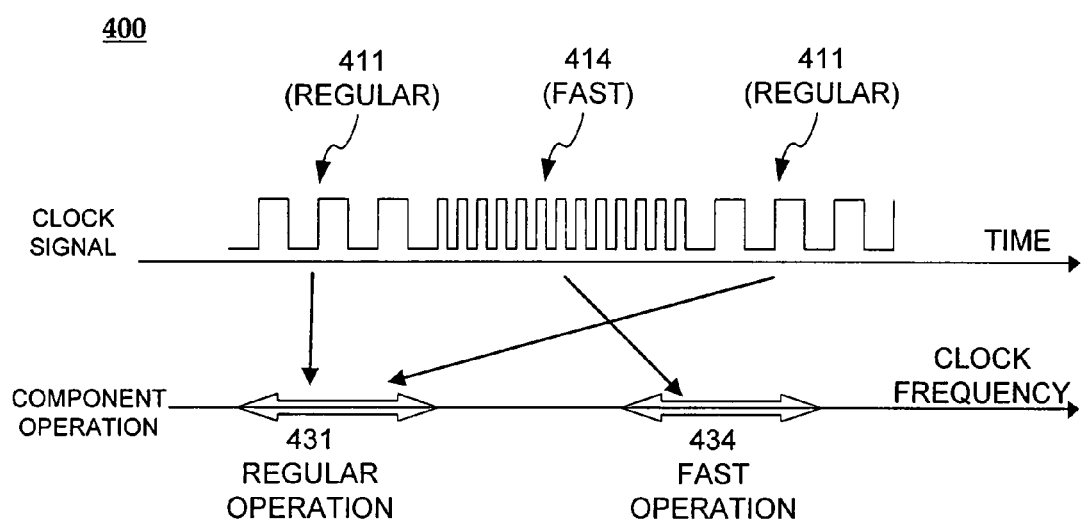
FIG. 4 is a signal diagram illustrating how a component of the RFID tag circuit of FIG. 3 can be operated at two different clock frequencies according to embodiments.

FIG. 4 is a signal diagram 400 for explaining operation of component 350 at different frequencies. The clock signal can have different frequencies such as regular (411) and fast (414). In some embodiments, not shown in FIG. 4, the clock signal can have an additional frequency, such as approximately between the regular and the fast frequency. Or it can cover the full range between the regular and the fast frequency.

The component 350 may then be operated in a regular operation (431), which occurs at the regular frequency 411, or at a fast operation (434) occurring at the fast frequency 414. For other frequencies, component 350 can operate accordingly.

A challenge with fast operation 434 is that semiconductor components of the circuits could become worn faster. This challenge can be addressed by tracking how long the component 350 has operated at the fast frequency, for the purposes of controlling it.

The duration may be determined a number of ways, for example by a suitable duration mechanism. Such a duration mechanism can be implemented in any number of ways, such as by further including, in circuit 330 of FIG. 3 a counter (not shown) of the pulses of the clock signal in the fast operation 414. The counter can counting pulses of the clock signal only at the faster frequency, e.g. with filtering the slow pulses by a filter, or be made otherwise.

Once the duration is reached, it can be limited. In the example with the counter, a limit mechanism can be set if the duration in a certain frequency exceeds a threshold. Such a limit mechanism can be a limit bit, a lock, a switch, etc. After that time, only the regular operation can be permitted. The tag can even backscatter a response as to whether the limit has been reached, or how long there is until it is reached, and so on.

Component 350 can be any component of circuit 330. Some such components are now described, by first describing main components of an RFID tag circuit.

Figure 5:
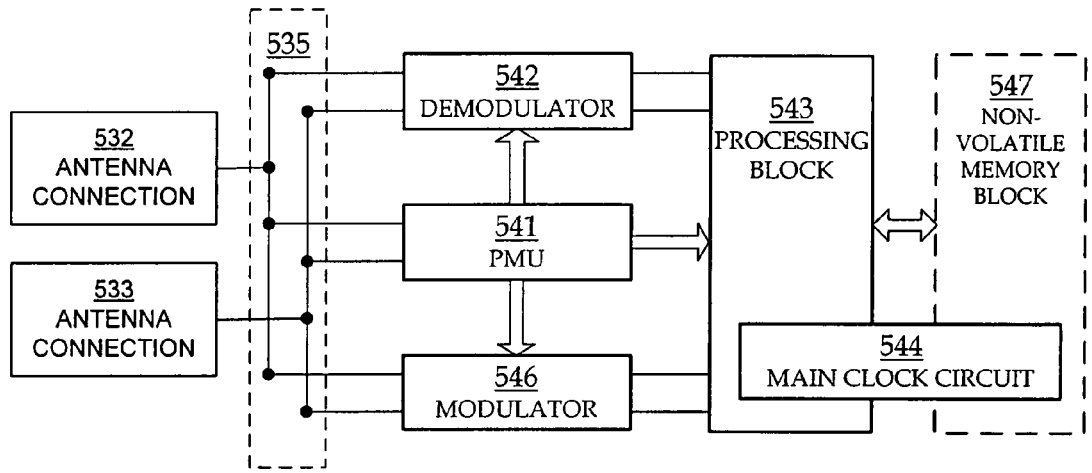
FIG. 5 is a block diagram of an electrical circuit of an RFID tag circuit.

FIG. 5 is a block diagram of an implementation of an electrical circuit 530 according to embodiments. Circuit 530 may be formed in an IC of an RFID tag, such as IC 224 of FIG. 2. Circuit 530 has a number of main components that are described in this document, and components additional from what is shown and described, or different components, depending on the exact implementation.

Circuit 530 includes at least two antenna connections 532, 533, which are suitable for coupling to one or more antenna segments (not shown in FIG. 5). Antenna connections 532, 533 may be made in any suitable way, such as pads and so on. In a number of embodiments more than two antenna connections are used, especially in embodiments where more antenna segments are used.

Circuit 530 includes a section 535. Section 535 may be implemented as shown, for example as a group of nodes for proper routing of signals. In some embodiments, section 535 may be implemented otherwise, for example to include a receive/transmit switch that can route a signal, and so on.

Circuit 530 also includes a Power Management Unit (PMU) 541. PMU 541 may be implemented in any way known in the art, for harvesting raw RF power received via antenna connections 532, 533. In some embodiments, PMU 541 includes at least one rectifier, and so on.

In operation, an RF wave received via antenna connections 532, 533 becomes received by PMU 541 as a signal. The signal is used for both harvesting its power and decoding it.

Circuit 530 additionally includes a demodulator 542. Demodulator 542 demodulates an RF signal received via antenna connections 532, 533. Demodulator 542 may be implemented in any way known in the art, for example including an attenuator stage, amplifier stage, and so on.

Circuit 530 additionally includes a modulator 546. Modulator 546 modulates an output signal generated by processing block 543. The modulated signal is transmitted by driving antenna connections 532, 533, and therefore driving the load presented by the coupled antenna segment or segments. Modulator 546 may be implemented in any way known in the art, for example including a driver stage, amplifier stage, and so on.

In one embodiment, demodulator 542 and modulator 546 may be combined in a single transceiver circuit. In another embodiment, modulator 546 may include a backscatter transmitter or an active transmitter. In yet other embodiments, demodulator 542 and modulator 546 are part of a processing block 543, which is further described in detail.

Circuit 530 includes a processing block 543. Processing block 543 receives the demodulated signal from demodulator 542, and may perform operations. In addition, it may generate an output signal for transmission.

Processing block 543 may be implemented in any way known in the art. For example, processing block 543 may include a number of components, such as a processor, a memory, a decoder, an encoder, and so on.

Circuit 530 may optionally include a non-volatile memory block 547, which has a memory device that may be implemented in any number of ways known in the art. Such ways include, by way of examples and not of limitation, utilizing flash memory and other non-volatile memories. The non-volatile memory block 547 may be used to write and store data received by the circuit 530 or to access stored data to facilitate a process operation, such as when executing an RFID tag test.

The processing block 543 and the optional non-volatile memory block 547 may include, either exclusively or not, a main circuit clock 544, which is similar to the main circuit clock 344 of FIG. 3.

Component 350 of FIG. 3 can be any one of the components of FIG. 5, or a subcomponent of them. For example, component 350 may be non-volatile memory block 547, or a component of it. Or component 350 is a portion of processing block 543. In addition, or alternately, the component 350 may be an analog filter, an oscillator, a random number generator, and so on.

In addition, RFID tag circuit 330 of FIG. 3 may optionally have a second, and even a third component, which are operable at different frequencies, such as those of the clock signal. For example, a second component is capable of being operated at the regular frequency, while the first component is operated at the fast frequency. A third component, operable at either the regular frequency or fast frequency, may also be included, and so on.

Returning to FIG. 3, switching between frequencies can be performed in a large number of ways. For example, upon receiving a strong enough RF signal, for a long enough time, main clock circuit 344 can change the frequency of its output clock signal. Then it can return to the regular frequency, and so on.

In other embodiments, main clock circuit 344 optionally generates the clock signal, and/or controls its frequency, in response to receiving a control command. The control command can be encoded in a signal that is received in any number of ways, such as by wire, e.g. by a test probe applied to a wafer. It can also be received wirelessly, as described below.

Figure 6:
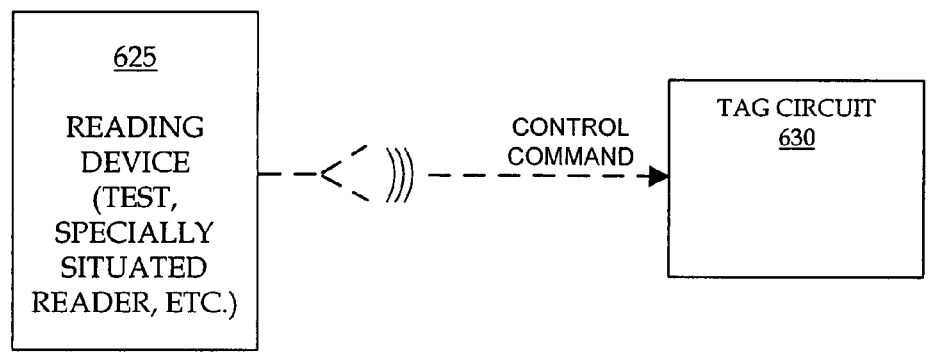
FIG. 6 is a block diagram showing how the RFID tag circuit of FIG. 3 can receive a control command according to embodiments.

FIG. 6 is a block diagram showing how an RFID tag circuit 630, optionally similar to circuit 330, can receive wirelessly the control command of FIG. 3. Device 625 is an RFID reader or similar device.

In some embodiments, device 625 is an actual RFID reader deployed in the field, where tags are known to be read in close range. Such can happen, for example, with pharmaceuticals, where individual readings are so critical. Device 625 is close to circuit 630 to enable fast operation.

In other embodiments, circuit 630 is being tested, either as a formed tag, or as a chip, separated from a wafer, or still part of the wafer. Again device 625 is predictably close to circuit 630 to enable fast operation.

Figure 7:
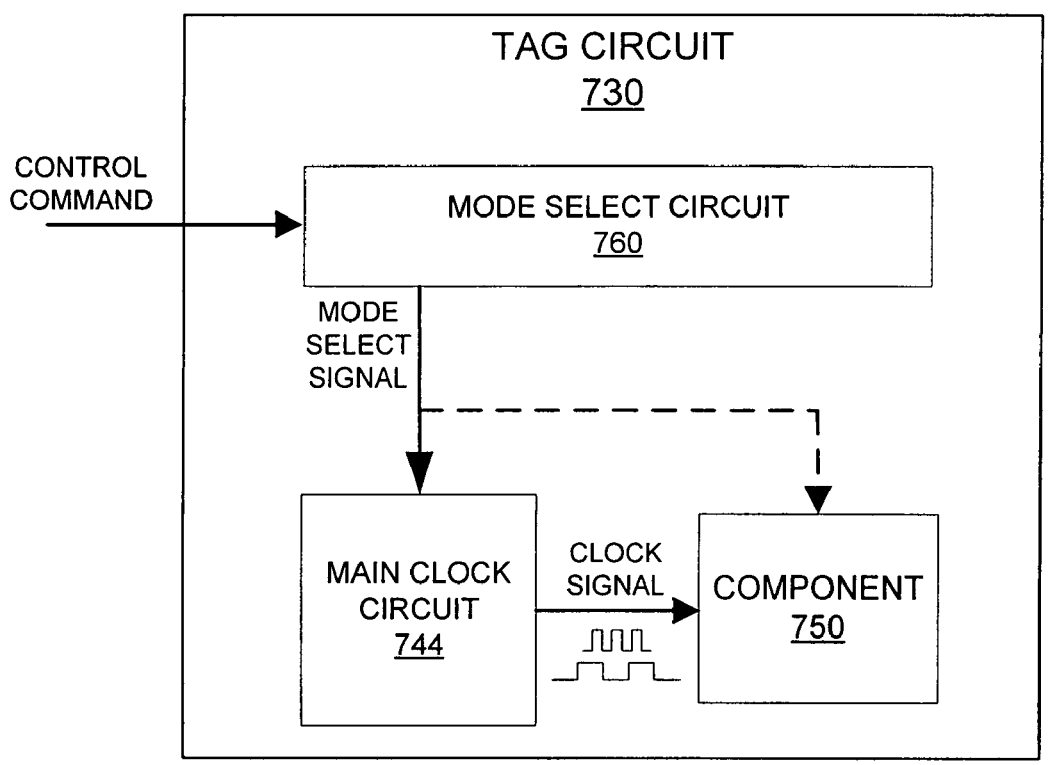
FIG. 7 is a block diagram of the RFID tag circuit of FIG. 3, and further having a mode select circuit according to optional embodiments.

FIG. 7 is a block diagram of an RFID tag circuit 730 according to embodiments of tag circuit 330. Circuit 730 has a main clock circuit 744 like main clock circuit 344, and a component 750 like component 350. Main clock circuit 744 and component 750 are further adapted as per the below.

Circuit 730 includes a mode select circuit 760, which generates a mode select signal in response to the received control command. The mode select signal may be designed to control the frequency of the clock signal by being received by main clock circuit 744. The mode select signal may be received by component 750, to control its operation at the different frequencies.

Figure 8:
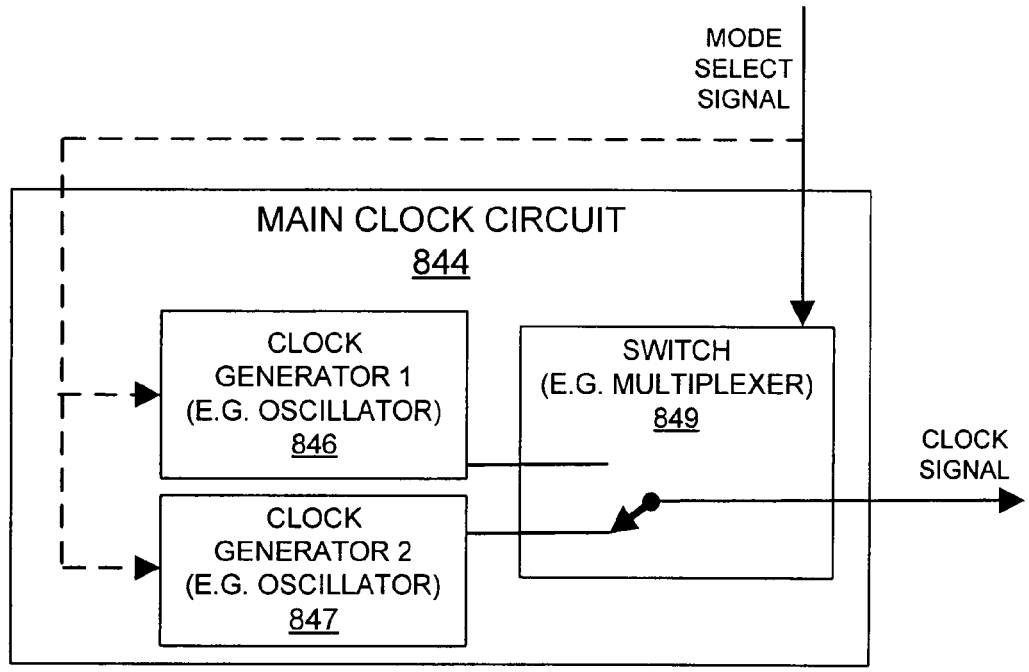
FIG. 8 is a block diagram of an implementation of the main clock circuit of FIG. 7 that includes two clock generators, according to an embodiment.

FIG. 8 is a block diagram of a main clock circuit 844, for implementing main clock circuit 744 of FIG. 7. Main clock circuit 844 includes two clock generators 846, 847, according to an embodiment. The first clock generator 846 may be enabled to generate an individual signal at the regular frequency, while the second clock generator 847 may be operable to generate an individual signal at the fast frequency.

The main clock circuit 844 also includes a switch 849, such as a multiplexer, which selects one of the individual signal outputs from either the first clock generator 846 or the second clock generator 847. The signal is selected in response to the received mode select signal and outputted as the clock signal. The mode select signal may optionally be supplied to one of the clock generators 846, 847 to allow one of the individual signals to be selected in response to the mode select signal. The other one will not be working, which will conserve power for the tag circuit.

Figure 9:
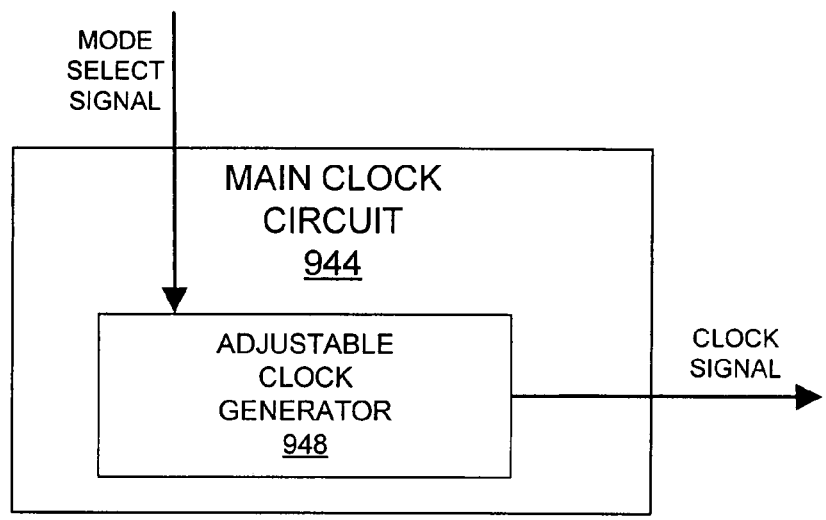
FIG. 9 is a block diagram of an implementation of the main clock circuit of FIG. 7 having an adjustable clock generator, according to an embodiment.

FIG. 9 is a block diagram of a main clock circuit 944, for implementing main clock circuit 744 of FIG. 7. Main clock circuit 944 has an adjustable clock generator 948, according to an embodiment. The adjustable clock generator 948 may be any circuit, device or system that generates an individual signal of an adjustable frequency in response to the mode select signal, and then outputs the signal as the clock signal. Examples of the adjustable clock generator 948 are described next.

Figure 10:
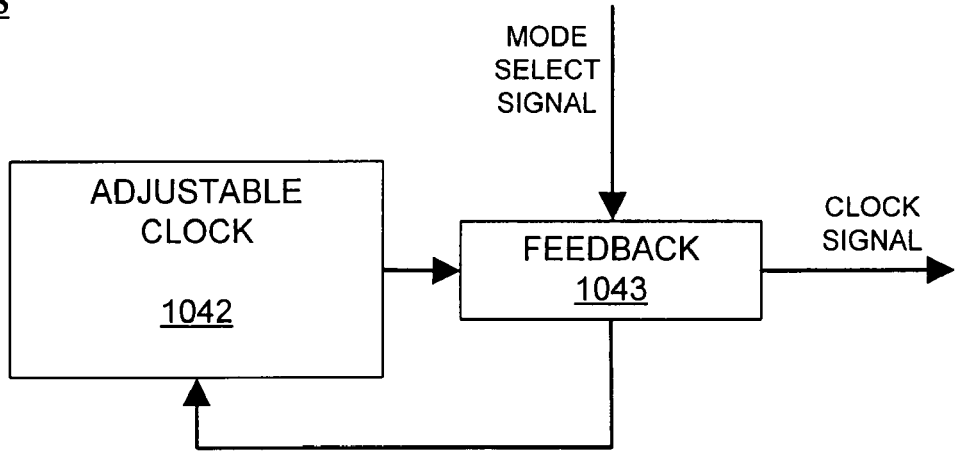
FIG. 10 is a block diagram showing the adjustable clock generator of FIG. 9 that includes a feedback mechanism, according to an embodiment.

FIG. 10 is a block diagram of an adjustable clock generator 1048, for implementing adjustable clock generator 948 of FIG. 9. Adjustable clock generator 1048 includes an adjustable clock 1042 coupled to a feedback mechanism 1043, according to an embodiment. The feedback mechanism 1043 can be implemented in any way, and can be used to compare and adjust the clock signal to a desired frequency in response to the mode select signal. For example, the feedback mechanism 1043 may be part of an internal oscillator that returns a signal to the adjustable clock generator 1042 for comparing to the clock signal and making necessary adjustments.

Alternatively, the feedback mechanism 1043 may also be enabled to receive a signal from an external component such as from a delay-lock loop, a phase-lock loop, and so on. The signal from the external component can then be used to compare to the clock signal and adjust the clock signal responsive to the mode select signal.

Figure 11:
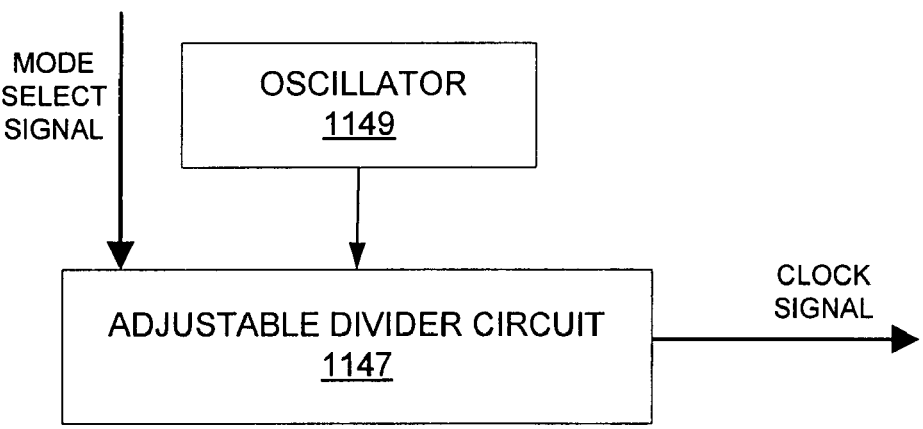
FIG. 11 is a block diagram showing the adjustable clock generator of FIG. 9 that utilizes an adjustable divider circuit, according to another embodiment.

FIG. 11 is a block diagram of an adjustable clock generator 1148, for implementing adjustable clock generator 948 of FIG. 9. In adjustable clock generator 1148 an oscillator 1149 outputs a signal, which an adjustable divider circuit 1147 divides that signal to generate the clock signal. The divider circuit 1147 may be implemented in any suitable way.

Figure 12:
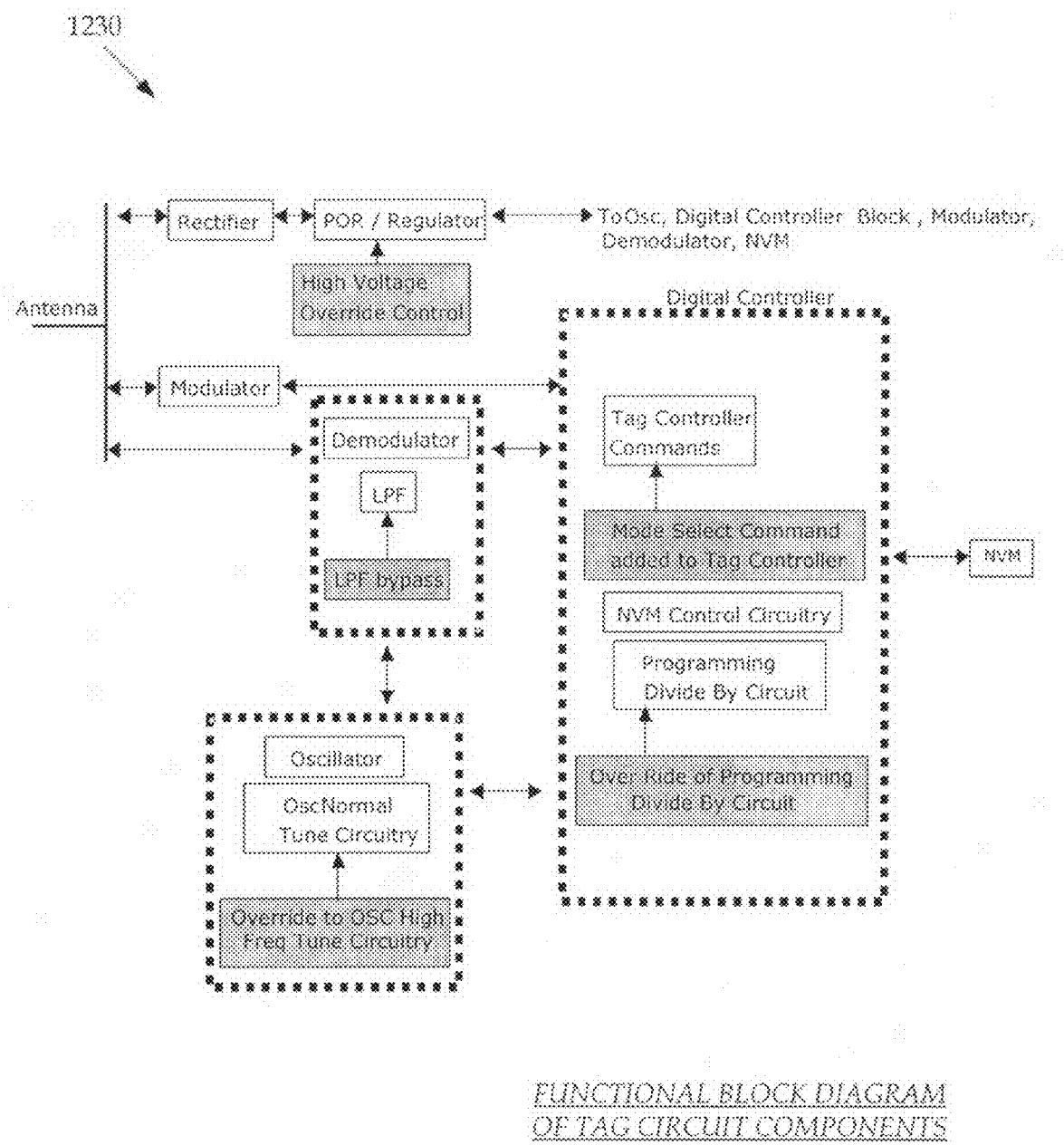
FIG. 12 is a functional block diagram of an RFID tag circuit illustrating where individual components can be modified to implement various embodiments.

FIG. 12 is a functional block diagram of an RFID tag circuit 1230 illustrating where individual components of an RFID tag circuit can be modified to implement the various embodiments previously described. In circuit 1230 it will be recognized that the unshaded parts can be used for normal operation at the regular frequency. In addition, the shaded parts are for implementing operation at faster frequencies.

Figure 13:
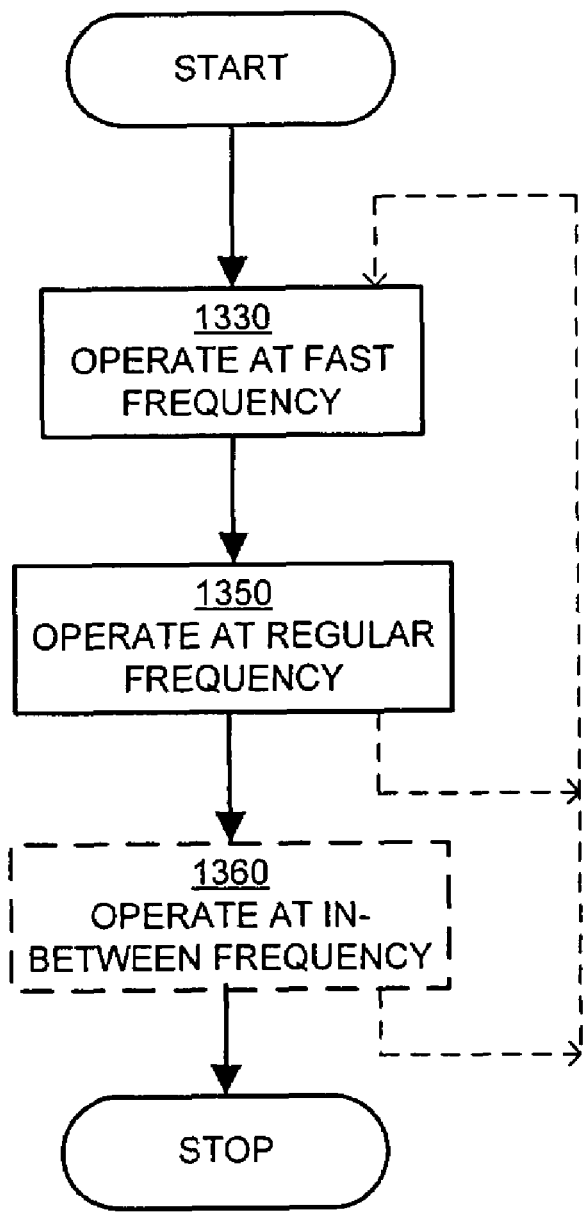
FIG. 13 is a flowchart for describing methods according to embodiments.

FIG. 13 is a flowchart 1300 for describing methods according to embodiments. The method of flowchart 1300 may be practiced in a number of ways, such as the ways described above, to operate an RFID tag or chip at different frequencies. For example, these methods may be implemented during testing of RFID tags, where the tags are enabled to operate at a higher frequency for achieving a faster process time.

According to an operation 1330, a component of the RFID tag can be operated at a fast frequency. At a next operation 1350, the component can then be operated at a regular frequency, in a manner such that the fast frequency of operation 1330 is at least 50% higher than at the regular frequency of operation 1350.

According to a next operation 1360, the component may be operated at a third frequency that is a frequency value approximately between the regular frequency and the fast frequency. As indicated by the dotted paths of FIG. 13, the component can optionally return to the first mode of operating at the fast frequency of operation 1330 after operating at the regular frequency of operation 1350. In this manner, the component's operating frequency may optionally be toggled between two or more frequencies.

In another embodiment, the methods of the flowchart 1300 may include a second component whose operating frequency may be implemented in any of the ways described above. Additionally, the second component may be operated at the fast frequency while the first component is operated at the regular frequency. Alternatively, both components may be operated at the same frequency. If a third component is included, then each of the first, second and third components may be operable at any combination of the different frequencies previously described.

Figure 14:
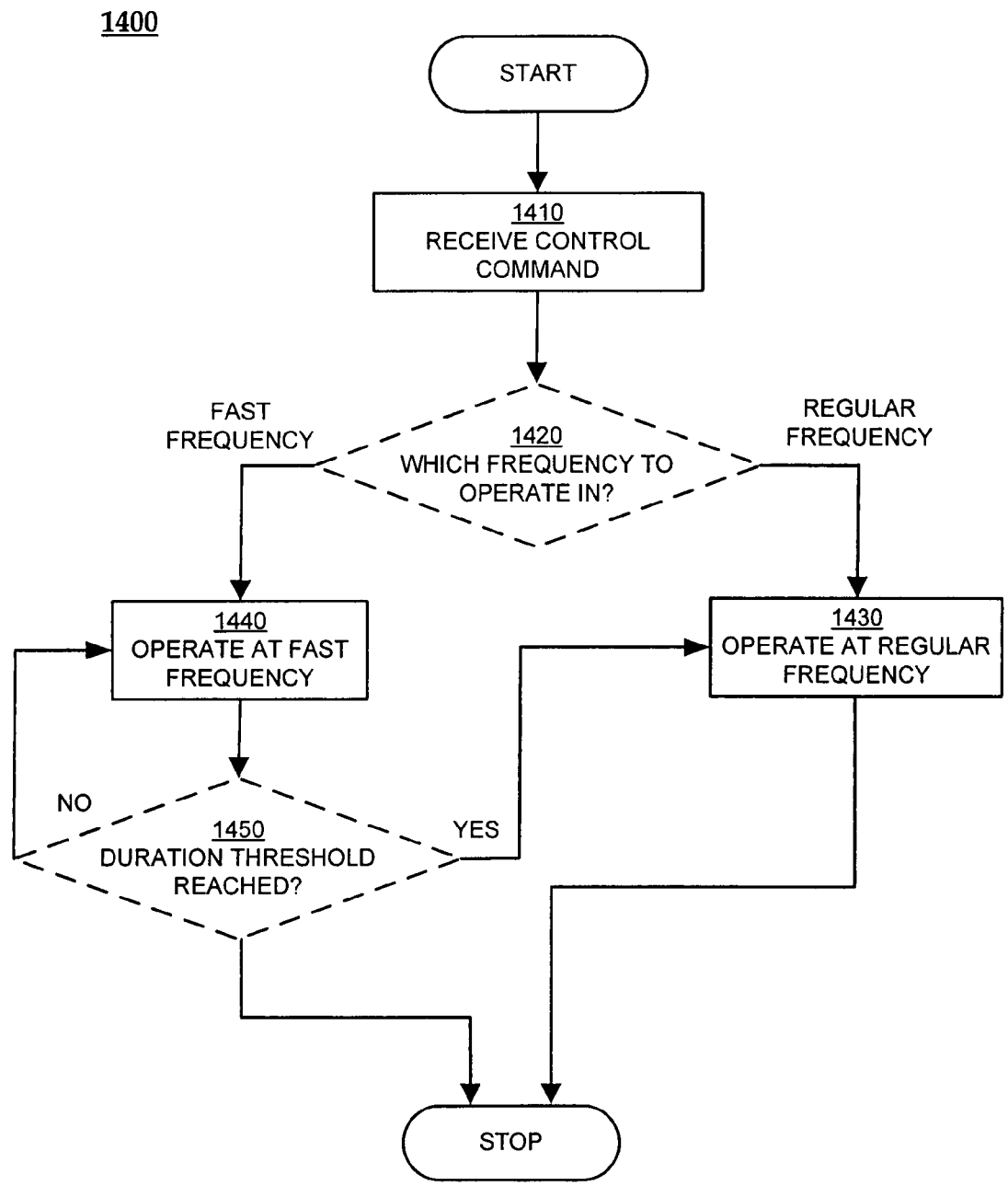
FIG. 14 is another flowchart for describing methods according to embodiments.

FIG. 14 is another flowchart 1400 for describing methods according to embodiments. The method of flowchart 1400 may also be practiced in any of the ways described above. The methods described by the flowchart 1400 describe operating a component at different frequencies responsive to receiving a control signal. For example, a component of an RFID tag may receive a control signal to place the component in either a first mode of operation at a regular frequency or a second mode of operation at a fast frequency.

According to an operation 1410, a control command is received, which determines the frequency of a clock signal that controls the operation of some component of the RFID tag. The control command can be provided in any number of ways, for example by a processor or an RFID reader as previously described. The control command of operation 1410, indicates whether a clock signal (not shown) should be generated having the fast frequency or the regular frequency.

According to an optional next operation 1420, it is inquired which frequency to operate in, responsive to the control command of operation 1410. The answer may be optionally embodied in a mode select signal, which may be generated responsive to the received control command, to decide which of the frequencies to operate some component at.

If the selected frequency is the regular frequency, then according to an operation 1430 the component is operated at the regular frequency.

If the selected frequency is the fast frequency, then according to an operation 1440 the component is operated at the fast frequency.

According to an optional operation 1450, the duration of how long the component has operated at the fast frequency is determined. The duration may be determined by any suitable means, such as by a counter that counts pulses of the duration, as described above. If the duration reaches the threshold, operation may revert to operation 1430, where component is operated at the regular frequency. An interface can advise the user accordingly, and so on.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and subcombinations of elements, features, steps, and/or functions, which are regarded as novel and non-obvious. Additional claims for other combinations and subcombinations may be presented in this or a related document.

What is claimed is:

1. A circuit for use in constructing an RFID tag having an antenna, the circuit comprising at least two antenna connections for coupling to the antenna; a demodulator coupled to the antenna connections;
   a main clock circuit operable to generate a clock signal having at least one of a regular frequency and a fast frequency that is at least 50% faster than the regular frequency;
   a first component coupled to receive the clock signal, the first component operable at either one of the regular frequency and the fast frequency responsive to the clock signal a duration mechanism to determine a duration of how long the first component has operated at the fast frequency; and
   in which a limit mechanism is set if the duration exceeds a threshold, and
   the first component is no longer operable at the fast frequency if the limit mechanism is set.

2. The circuit of claim 1, in which the fast frequency is at least 75% faster than the regular frequency.

3. The circuit of claim 1, in which
   the clock signal can have a frequency third value approximately between the regular frequency and the fast frequency, and
   the first component is operable at the frequency of the third value.

4. The circuit of claim 1, in which
the clock signal is of adjustable frequency that can take any value in the range between the regular frequency and the fast frequency, and
the first component is operable at any one frequency in the range.

5. The circuit of claim 1, in which
the first component is one of an analog filter, an oscillator, and a random number generator.

6. The circuit of claim 1, in which the first component belongs to a processor.

7. The circuit of claim 1, in which
the first component includes a memory.

8. The circuit of claim 1, further comprising:
a second component operable at either one of the regular frequency and the fast frequency.

9. The circuit of claim 8, in which
the second component is operable at the regular frequency while the first component is operable at the fast frequency.

10. The circuit of claim 8, further comprising:
a third component coupled to receive the clock signal, the third component operable at either one of the regular frequency and the fast frequency.

11. The circuit of claim 1, in which the duration mechanism includes a counter.

12. The circuit of claim 1, in which the duration is determined by counting pulses of the clock signal at the fast frequency.

13. The circuit of claim 1, in which
a response can be backscattered as to whether the limit mechanism has been set.

14. The circuit of claim 1, in which
the clock signal has one of the regular frequency and the fast frequency depending on a received control command.

15. The circuit of claim 14, in which
the control command is received wirelessly.

16. The circuit of claim 14, in which
the control command is received by an RFID reader.

17. The circuit of claim 14, in which
the control command is received by a test implementation device.

18. The circuit of claim 17, in which
the test implementation device includes a test probe for contacting the circuit.

19. The circuit of claim 14, further comprising:
a mode select circuit operable to output a mode select signal responsive to the received control command, and
in which the clock signal has one of the regular frequency and the fast frequency depending on the mode select signal.

20. The circuit of claim 19, in which
the first component is coupled to receive the mode select signal.

21. The circuit of claim 19, further comprising:
a first clock signal generator operable to generate an individual signal at the regular frequency;
a second clock signal generator operable to generate an individual signal at the fast frequency; and
a switch operable to output one of the individual signals as the clock signal responsive to the mode select signal.

22. The circuit of claim 19, further comprising:
an adjustable clock signal generator operable to generate an individual signal of an adjustable frequency as the clock signal responsive to the mode select signal.

23. The circuit of claim 22, further comprising:
a feedback mechanism for comparing and adjusting the clock signal to a first frequency.

24. The circuit of claim 22, in which the adjustable clock signal generator includes a signal generator and an adjustable divider.

25. A method for a circuit intended for use in constructing an RFID tag having an antenna, the circuit having at least two antennas connection for coupling to the antenna, a demodulator coupled to the antenna connections, and a first component, the method, comprising:
operating the first component at a regular frequency;
operating the first component at a fast frequency, the fast frequency being at least 50% higher than the regular frequency determining a duration of how long the first component has operated at the fast frequency;
setting a limit mechanism of the duration exceeds a duration threshold; and
no longer operating the first component at the fast frequency if the limit mechanism has been set.

26. The method of claim 25, in which
the fast frequency is at least 75% faster than the regular frequency.

27. The method of claim 25, further comprising:
operating the first component at a third frequency that has a value approximately between the regular frequency and the fast frequency.

28. The method of claim 25, further comprising:
then operating the first component again at the regular frequency.

29. The method of claim 25, in which
the first component belongs to a processor.

30. The method of claim 25, in which
the first component comprises a memory.

31. The method of claim 25, in which
the first component is operated responsive to receiving a clock signal whose frequency is one of the regular frequency and the fast frequency.

32. The method of claim 25, in which
the RFID tag circuit also has a second component, and
further comprising: operating the second component at the fast frequency while the first component is operated at the regular frequency.

33. The method of claim 32, further comprising:
then operating the second component at the regular frequency while the first component is operated at the regular frequency.

34. The method of claim 25, in which
the duration is determined by counting pulses.

35. The method of claim 25, further comprising: in which a response can be backscattered as to whether the limit mechanism has been set.

36. The method of claim 25, further comprising:
receiving a control command, and
in which the frequency of the clock signal is determined from the control command.

37. The method of claim 36, in which
the control command is received wirelessly.

38. The method of claim 36, in which
the test implementation device is an RFID reader.

39. The method of claim 36, in which
the control command is received by a test implementation device.

40. The method of claim 39, in which
the test implementation device is a test probe that contacts the RFID tag circuit.

41. The method of claim 36, further comprising:
outputting a mode select signal responsive to the received control command, and
in which the clock signal has one of the regular frequency and the fast frequency depending on the mode select signal.
42. The method of claim 41, in which
the first component receives the mode select signal.
43. The method of claim 41, further comprising:
generating an individual signal at the regular frequency;
generating an individual signal at the fast frequency; and
outputting one of the individual signals as the clock signal responsive to the mode select signal.
44. The method of claim 41, further comprising:
adjusting an adjustable clock signal generator to generate the clock signal responsive to the mode select signal.
45. The method of claim 44, in which
adjusting includes adjusting an adjustable divider.

* * * * *